United States Patent [19]

Kurahara et al.

[11] Patent Number: 5,285,387

[45] Date of Patent: Feb. 8, 1994

[54] METHOD FOR LINKING AN APPLICATIONS PROGRAM AND A CONVERSION PROGRAM

[75] Inventors: Yasuhiro Kurahara, Kobe; Toshihisa Aoki, Hyogo; Takumi Otani, Kobe; Masaaki Imai, Kobe; Nobuhisa Takahashi, Kobe, all of Japan

[73] Assignee: Hewlett-Packard Company, Palo Alto, Calif.

[21] Appl. No.: 606,626

[22] Filed: Oct. 31, 1990

[30] Foreign Application Priority Data

Oct. 31, 1989 [JP] Japan .................. 1-283906

[51] Int. Cl.⁵ ................... G06F 15/38
[52] U.S. Cl. .................. 364/419.09; 395/156
[58] Field of Search ........... 364/419; 395/156

[56] References Cited

FOREIGN PATENT DOCUMENTS

| | | | |
|---|---|---|---|
| 58-87618 | 5/1983 | Japan | 364/419 |
| 60-142463 | 7/1985 | Japan | 364/419 |
| 60-157661 | 8/1985 | Japan | 364/419 |
| 60-173667 | 9/1985 | Japan | 364/419 |
| 60-195663 | 10/1985 | Japan | 364/419 |
| 60-251468 | 12/1985 | Japan | 364/419 |
| 61-3267 | 1/1986 | Japan | 364/419 |

OTHER PUBLICATIONS

Maurice J. Bach, "The Design of the Unix Operating System", Chap. 11, pp. 355-390, Prentice-Hall, 1986.
Mac Rochkind, "Advance UNIX Programming", Chapters 6-7, pp. 123-207, Prentice-Hall, 1985.
Adrian Nye, "Xlit Programming Manual for Version II", Chapter 8, pp. 215-246, O'Reilly & Associates, Inc., 1988.

Primary Examiner—Roy N. Envall, Jr.
Assistant Examiner—Xuong Chung

[57] ABSTRACT

The present invention provides a standardized interface between an conversion program and an applications program where the conversion program processes input data for the applications program. The interface advantageously provides in place conversion of the input data when the applications program operates in a multi-window environment. By using a standardized interface, applications programs may be simplified, while any conversion program may be reused in conjunction with any applications program.

14 Claims, 3 Drawing Sheets

METHOD FOR LINKING AN APPLICATIONS PROGRAM AND A CONVERSION PROGRAM

FIELD OF THE INVENTION

The present invention is related to a text-displaying applications program operating in a multi-tasking environment where a separate conversion program can concurrently perform phonetic-to-hieroglyphic symbol conversion in place.

BACKGROUND OF THE INVENTION

A Japanese word-processor requires input characters to be converted into a different character set. The Japanese language consists of three different character sets. One character set is known as Kana, and another is known as Kanji. The third set is not pertinent for this application. Kana characters are phonetic symbols, while Kanji characters are hieroglyphic and represent entire words or phrases. A string of Kana characters may be phonetically equivalent to a fewer number of Kanji characters. For a single set of Kana characters, it is possible to convert it into more than one set of Kanji characters. That is, different Kanji characters may have the same pronunciation with different meanings.

Japanese writing requires both Kana and Kanji characters. The appropriate Kanji symbol must replace certain combinations of Kana characters. Using a Japanese word processor, a user inputs Kana characters into a computer via a Kana-labeled keyboard. A Kana-to-Kanji conversion program generally displays the Kana characters input then is intermediate conversion result which are possible Kanji characters for substitution. The user selects the appropriate Kanji characters from the displayed candidates. The selected characters are then substituted into the input string by the Kana-to-Kanji conversion program before the input string is output to the applications software. Such a Kana-to-Kanji converter is well known in the prior art.

Some Kana-to-Kanji conversion programs provide in-place conversions. The input string and intermediate conversion appear at the input cursor position. When the substitution is made, the selected Kanji characters are inserted at this cursor position. In-place conversions have an advantage over other conversion methods which provide a separate conversion line to display the input string and intermediate results because the user can focus only on the cursor position rather than both conversion line and cursor position.

Development of a Kana-to-Kanji conversion program requires considerable technical expertise and labor. In implementing a Japanese text-oriented applications program, it is desirable to separate the Kana-to-Kanji conversion program from the applications program, rather than embedding the Kana-to-Kanji conversion program in the applications program. One advantage of separation is that it becomes easier to separately develop the two programs. With a well-defined interface between the conversion program and the applications program, it is possible to reuse the conversion program or one can modify either the applications program or the conversion program without affecting the other program. Such independence allows the user to choose any Kana-to-Kanji conversion programs available in the market with which he feels comfortable. He can even develop one to obtain more sophisticated man-machine interface for Kana-to-Kanji conversion without modifying the applications program itself.

Many work station-based applications programs run in a multi-window environment to provide a favorable man-machine interface. However, it is not easy to perform the in-place conversion in a multi-window-based applications program. When in-place conversion takes place, the Kana-to-Kanji conversion program must know the input cursor position of the applications program in order to open an overlapping conversion window at the cursor position and to display the phonetic expression and its intermediate conversion results as if the applications program did it. Commonly available multi-window systems do not provide a means for a conversion program to directly acquire the cursor position in the application program's window. In order to solve this problem, the structures shown in FIGS. 1 (A) and 1 (B) have been employed in the prior art.

One modular arrangement in the prior art shown in FIG. 1 (A) has the applications program module, the user interface module, and the Kana-to-Kanji conversion module. Since the conversion module is a part of the applications program, the current cursor position is readily available to the conversion module.

An example shown in FIG. 1 (B) in the prior art separates only the Kana-to-Kanji conversion module from the applications program, but combines user interface as an integral part of the applications program. This is rather straightforward because the Kana-to-Kanji conversion algorithm performed in the Kana-to-Kanji conversion module shown in FIG. 1 (B) does not require the information on the cursor position. Although this modular arrangement 1 (B) has an advantage over FIG. 1 (A) in that the Kana-to-Kanji conversion program can be reused, the user interface, which would require considerable labor, has to be rewritten for each new applications program. Because the user interfaces are usually different for each language, for example Japanese and Korean, the structure of FIG. 1(B) wherein the user interface is buried in the body of the applications program will be a bar to implementing the language-independent applications program. In addition, it is more difficult to change the Kana-to-Kanji conversion programs, since the changes affect the user interfaces.

SUMMARY OF THE INVENTION

The current invention is related to a method of providing phonetic-to-hieroglyphic symbol conversion in a computer system. When the user inputs text, a separately executing conversion program receives the inputted phonetic symbols. The conversion program is kept informed of the current cursor position of the applications programs' window to which the result of the conversion is to enter. The applications program that uses the conversion program provides this information through a uniformly defined interface between the conversion program and the applications program. Using this information, the conversion program opens an overlapping window at the cursor position of the applications program's window to display the string of the inputted phonetic symbols and the intermediate result of the conversion that is a string of phonetic and hieroglyphic symbols. When the user hits a key assigned for effecting the conversion, the string of the phonetic symbols inputted through the keyboard and displayed in the overlapping window is converted to an intermediate conversion result, or candidate of the conversion that the conversion program "thinks" the most appropriate. If the user is not satisfied with the candidate, he may hit the conversion key again to have the conversion program replace that candidate with the next one. When the candidate in the overlapping window ultimately becomes what the user wants to have, he selects the candidate by hitting a key assigned for finalizing the conversion. The overlapping window is then closed, or disappears, and the established result of the conversion, that is, the candidate displayed on the overlapping window when the finalizing key is hit, is transferred to the applications program. Upon receiving the resulted string of phonetic and hieroglyphic symbols, the application program displays it in its window at the cursor position.

DETAILED DESCRIPTION OF THE INVENTION

Figure 1:
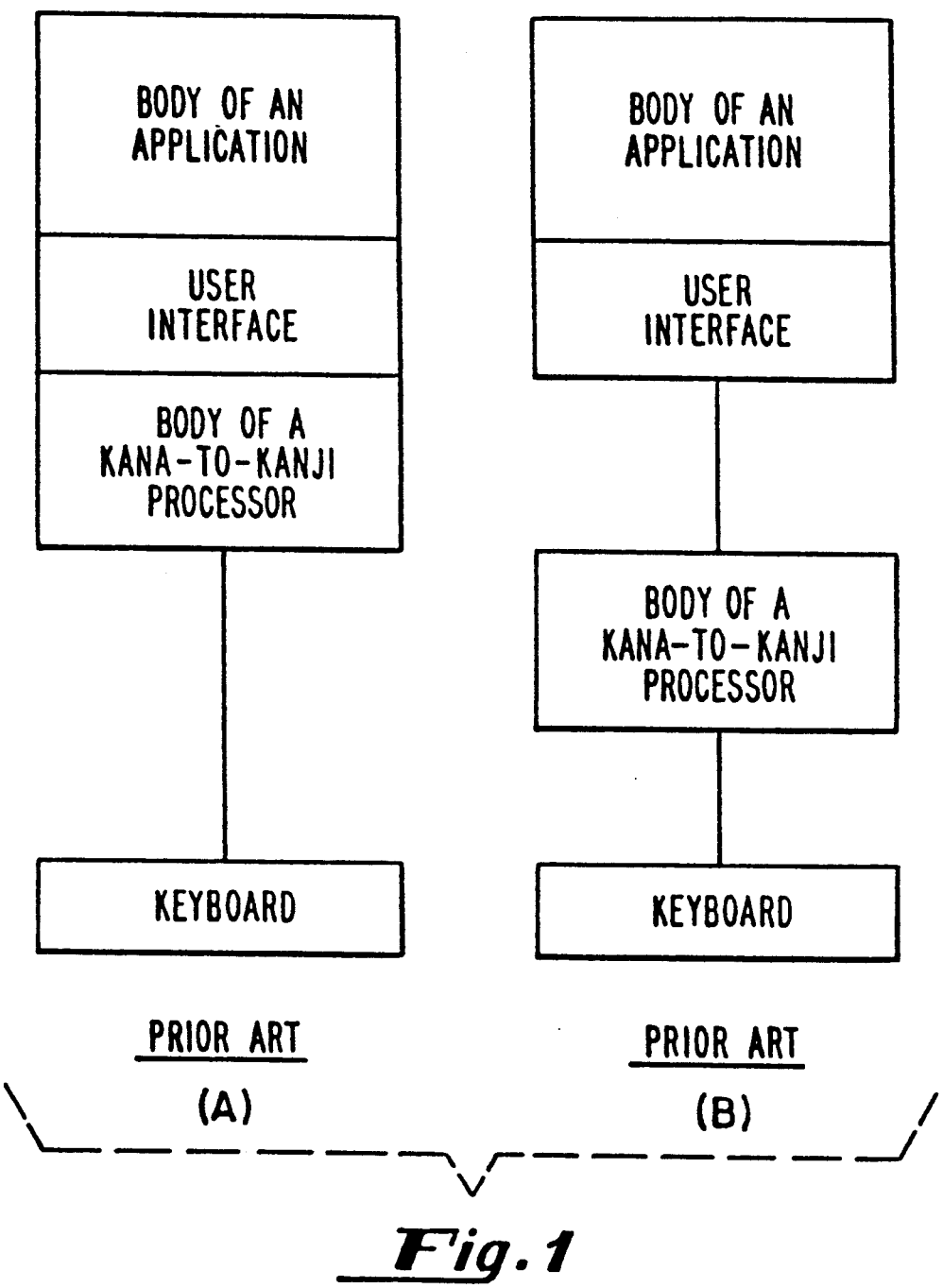
FIG. 1 is a diagram showing the problems of the prior art.
Figure 2:
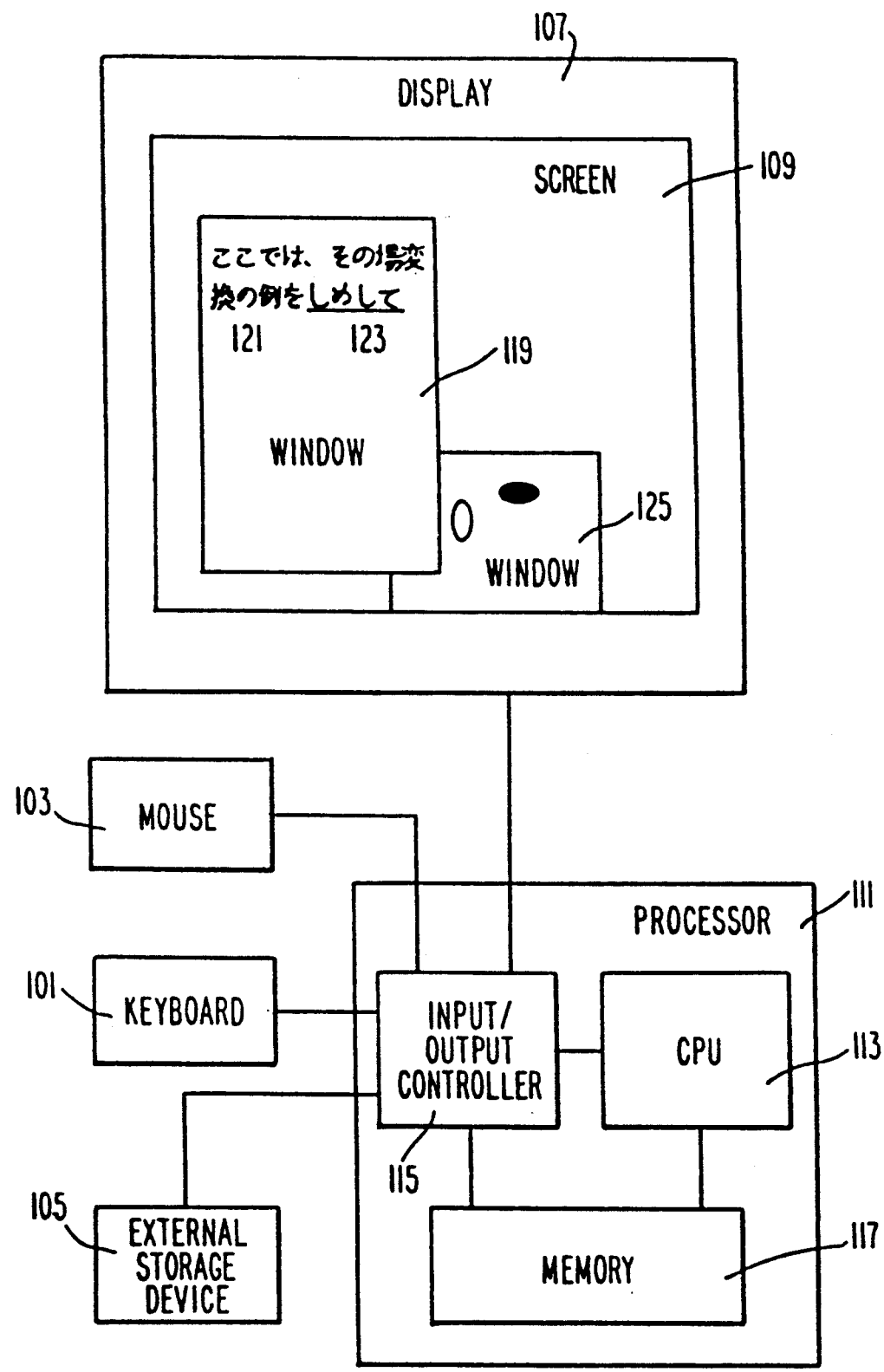
FIG. 2 is a block diagram of a computer system to which the present invention, is applied.

FIG. 2 shows a block diagram of one embodiment of the present invention. CPU 113 within processor 111 controls input/output devices such as keyboard 101, mouse 103, external storage device 105 and display 107 by input/output controller 115 and the controller program in memory 117. CPU 113 also executes an applications programs. A phonetic expression is input via keyboard 101. Once the phonetic symbols have been Kana-to-Kanji converted, they are displayed in window 119 on screen 109 of the display unit 107. Note that the resulted string of the Kana-to-Kanji conversion does not always comprise only Kanji symbols. It may be a mixture of Kana and Kanji symbols; it may even comprise only Kana symbols. Within window 119, text 121:

ここでは、その場変換の例を has already been converted. The underline text 123 next to text 121:

しめして is being converted in place by the conversion program.

Figure 3:
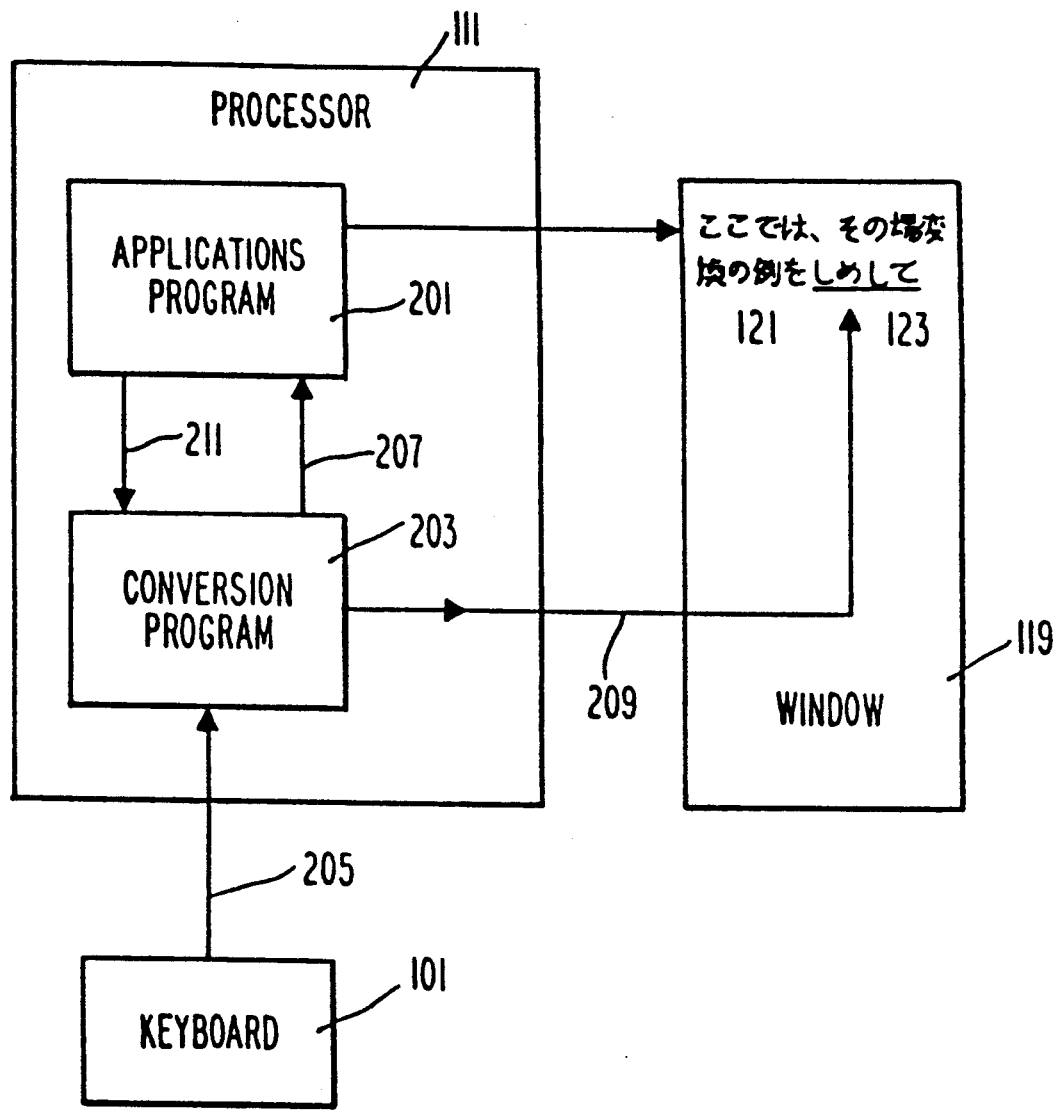
FIG. 3 is a block diagram of a preferred embodiment of the present invention.

FIG. 3 is a block diagram of a preferred embodiment of the present invention. Phonetic expression 205 is input via keyboard 101 and is first passed to conversion program 203 for Kana-to-Kanji conversion. The Kana-to-Kanji conversion is well known to those skilled in the art. Once the conversion is finalized, conversion program 203 passes result 207 to applications program 201. Applications program 201 in turn displays result 207 in window 119 which applications program 201 itself has opened. In FIG. 3, text 121:

ここでは、その場変換の例を is shown in the display window 119.

In window 119 in FIG. 3, text 123 is the phonetic input expression and/or the intermediate conversion results. Conversion program 203 is processing:

しめして and displaying text 123 at the position immediately next to text 121 that is, at the current cursor position in window 119. Text 123 is not displayed in window 119 but actually in a separate window, which conversion program 203 has opened over window 119 at the current cursor position in window 119. The cursor in window 119 is hidden behind the character 'ㄴ' of the first character in text 123.

Applications program 201 passes to the conversion program 203 window attribute 211. Whenever the applications program 201 changes any of the window attributes 211, conversion program receives updated window attributes 211, so that conversion program 203 can open the overlapping window at the appropriate cursor position. In addition to the cursor position, window attributes 211 preferably include the font, the foreground and background colors, and the size of the window 119. Thus, conversion program 203, based upon window attributes 211, opens an overlapping conversion window to display the string of the phonetic symbols entered by the user and intermediate result 209 at the specified cursor position with the appropriate font, colors and size of the conversion window 119.

At the beginning of conversion, conversion program 203 opens a conversion window at the cursor position specified by applications program 201, places phonetic input characters 205 in the conversion window, and displays the intermediate result of the conversion as conversion progresses. Once the conversion is finalized by user selection, the conversion program 203 passes the selected conversion 207 to applications program 201 and closes the conversion window. During this process, the entire conversion process appears to take place at the input cursor position in window 119. However, applications program 201 receives no information pertaining to conversion during the conversion process.

Transfer of the information between the conversion program 203 and applications program 201 can be implemented by, for example, interprocess communication which is well known to those skilled in the art. In coding the applications and conversion program, the initiation of such interprocess communication is usually written as a function call. Receiving of interprocess communication is invoked in response to transmission of such communication. Because the interprocess communication is well-known, no further explanation will be given here. However, the following documents are helpful in understanding the interprocess communication:

1. Maurice J. Bach: "THE DESIGN OF THE UNIX OPERATING SYSTEM", Chapter 11, pp. 355-390, PRENTICE-HALL, 1986 (explanation on the interprocess communication in UNIX System V)

2. Marc J. Rochkind: "ADVANCED UNIX PROGRAMMING", Chapters 6,7, pp. 123-207, PRENTICE-HALL, 1985 (explanation on the system calls relating to the interprocess communication and examples of their actual programming)

3. Adrian Nye: "Xlib Programming Manual for Version 11", Chapter 8, pp. 215-246, O'Reilly & Associates Inc., 1988 (explanation for writing programs using Xlib)

Some conversion programs do not perform in-place conversion. Consider an example of a Kana-to-Kanji conversion which reserves a conversion line or window at a fixed position outside of the applications program window to display the phonetic input and the-intermediate result. Since a conversion program of this type does not use the cursor position, when the applications program outputs the window attributes 211, the conversion program should disregard this information. In its implementation, a dummy function may be embedded in the code of the conversion program that returns to a calling function without doing anything upon invocation in response to interprocess communication. With this design, the applications program can provide any given conversion program with the window attributes through a uniform interface and receive the conversion result without knowing the operation of the conversion program.

It should be noted that the present invention is not limited to the specific embodiment described above, but its scope should be determined based on the claims. For example, in FIG. 3, the input via keyboard 101 is directly provided to conversion program 203 and is not passed to applications program 201. A different arrangement may be provided to first enter the keyboard input directly into the applications program 201, and then pass the phonetic symbols to the conversion program 203 so that the application may receive the result of the conversion only if Kana-to-Kanji conversion is specified. Furthermore, the role of the conversion program is not limited to Kana-to-Kanji conversion. For example, it may be designed for other hieroglyphic conversions or it may even be used to provide required processing on any input between a user and an applications program. It should also be emphasized that an applications program is not limited to word processing but may include any programs that need text input such as database applications programs.

While preferred embodiments of the invention have been described and various modifications have been suggested, other modifications will occur to those of ordinary skill in the art which will fall within the true spirit and scope of the invention as set forth in the appended claims.

We claim:

1. A method of providing a uniform interface between a phonetic-to-hieroglyphic conversion program and a text displaying applications program in a computer system comprising:
   (a) sending a current position of a cursor of a first window under the control of the applications program from the applications program to the conversion program when the position of the cursor is changed, regardless of whether or not the phonetic-to-hieroglyphic conversion program is of the type that needs the current cursor position of the first window;
   (b) inputting the phonetic symbols;
   (c) converting the inputted string of phonetic symbols in (b) to corresponding string of symbols comprising at least one of the hieroglyphic symbols and the phonetic symbols; the conversion being effected by the conversion program separate from the applications program;
   (d) displaying the converted string of symbols under the control of the conversion program;
   (e) selecting the displayed string of converted symbols;
   (f) sending the selected string of the symbols in (e) from the conversion program to the applications programs; and
   (g) displaying the received string in the first window.

2. The method recited in claim 1 wherein the phonetic symbols are Kana and the hieroglyphic symbols are Kanji in Japanese.

3. The method recited in claim 1 wherein converted results and unconverted phonetic symbols are displayed in a first window, and during the step (d) intermediate results of possible hieroglyphic symbols are displayed in a second window.

4. The method recited in claim 3 wherein the second window is movable and overlaps with the first window.

5. The method recited in claim 4 wherein the conversion program moves the position of the second window in response to the current position of the first window sent from the applications program.

6. The method recited in claim 5 wherein the applications program and the conversion program are concurrently and separated executable programs under a multi-tasking operating system.

7. The method recited in claim 3 wherein said second window is at a fixed location.

8. The method recited in claim 3 where a cursor position in the first window determines a location of the overlapping second window in the first window.

9. The method recited in claim 1 wherein communication between the conversion program and the applications programs takes place through interprocess communication.

10. The method recited in claim 9 wherein the inter process communication conveys information on the applications program window's cursor position, font and display color to the conversion program so that the conversion program can use the information to determine the position, font and display color for the second window.

11. The method recited in claim 1 wherein the input symbols are initially processed by the conversion program.

12. The method recited in claim 1 wherein the input symbols are initially processed by the application program.

13. A method recited in claim 1 wherein selecting the displayed string is accomplished by repeating the steps (c) through (f) until a user selects appropriate hieroglyphic symbols in step (e).

14. A method of providing a uniform interface between a text-displaying applications program and Kana-to-Kanji conversion program in a computer system comprising:
   (a) sending a current position of a cursor of a first window under the control of the applications program from the applications program to the conversion program when the position of the cursor is changed;
   (b) inputting Kana symbols;
   (c) converting the inputted Kana string in (b) to corresponding Kanji-Kana string comprising at least one of Kanji symbols and Kana symbols, the conversion being effected by the conversion program separate from the applications program;
   (d) displaying the converted Kana-Kanji string of symbols under the control of the conversion program in a movable and overlapping second window under the conditions specified by the applications program at a cursor position in a first window, such information passed via the interprocess communication;
   (e) selecting an appropriately converted Kanji-Kana symbols;
   (f) repeating the steps (c) through (e) until a user selects appropriately converted Kanji-Kana symbols in step (e), and
   (g) replacing the selected Kanji-Kana symbols passed to the applications program via the interprocess communication with corresponding text in the first window.

* * * * *

UNITED STATES PATENT AND TRADEMARK OFFICE
CERTIFICATE OF CORRECTION

PATENT NO.   : 5,285,387
DATED        : February 8, 1994
INVENTOR(S)  : Kurahara, et al.

It is certified that error appears in the above-indentified patent and that said Letters Patent is hereby corrected as shown below:

Column 1, line 33, change "is" to --its--.

Column 3, line 22, after "invention" delete --,--.

Column 4, line 59, change "the-inter-" to --the inter---.

Column 6, line 9, change "separated" to --separately--.

Column 6, line 27, change "input" to --inputted--.

Column 6, line 28, before "symbols" insert --phonetic--.

Column 6, line 30, change "input" to --inputted--.

Column 6, line 31, before "symbols" insert --phonetic-- and change "application" to --applications--.

Signed and Sealed this

Twenty-sixth Day of September, 1995

Attest:

BRUCE LEHMAN

*Attesting Officer*   *Commissioner of Patents and Trademarks*